(12) United States Patent
Miyahara et al.

(10) Patent No.: US 6,869,344 B2
(45) Date of Patent: Mar. 22, 2005

(54) APPARATUS FOR POLISHING OPTICAL DISK

(75) Inventors: Takakazu Miyahara, Kaseda (JP); Jiro Genozono, Kaseda (JP)

(73) Assignee: Elm Inc., Kaseda (JP)

( * ) Notice: Subject to any disclaimer, the term of this patent is extended or adjusted under 35 U.S.C. 154(b) by 0 days.

(21) Appl. No.: 10/468,893

(22) PCT Filed: Mar. 4, 2002

(86) PCT No.: PCT/JP02/01981
§ 371 (c)(1),
(2), (4) Date: Aug. 26, 2003

(87) PCT Pub. No.: WO02/070199
PCT Pub. Date: Sep. 12, 2002

(65) Prior Publication Data
US 2004/0072515 A1 Apr. 15, 2004

(30) Foreign Application Priority Data
Mar. 5, 2001 (JP) ........................................ 2001-111994

(51) Int. Cl.⁷ ................................................ B24B 7/00
(52) U.S. Cl. .......................... 451/287; 451/359; 451/495
(58) Field of Search ................................ 451/285, 287, 451/288, 290, 359, 495

(56) References Cited

U.S. PATENT DOCUMENTS

| 4,956,944 | A | * | 9/1990 | Ando et al. ............... | 451/5 |
| 5,607,341 | A | * | 3/1997 | Leach ...................... | 451/41 |
| 5,702,290 | A | * | 12/1997 | Leach ...................... | 451/41 |
| 5,827,111 | A | * | 10/1998 | Ball ......................... | 451/14 |
| 5,860,851 | A | * | 1/1999 | Beppu et al. ............ | 451/41 |
| 6,027,401 | A | * | 2/2000 | Saito et al. .............. | 451/398 |
| 6,083,083 | A | * | 7/2000 | Nishimura ............... | 451/41 |
| 6,312,320 | B2 | * | 11/2001 | Sato et al. ............... | 451/285 |
| 6,503,134 | B2 | * | 1/2003 | Shendon .................. | 451/398 |
| 6,609,959 | B2 | * | 8/2003 | Takahashi et al. ....... | 451/65 |

FOREIGN PATENT DOCUMENTS

| JP | A 5-285825 | 11/1993 |
| JP | A 8-1504 | 1/1996 |
| JP | A 9-97772 | 4/1997 |
| JP | A 11-90815 | 4/1999 |

* cited by examiner

Primary Examiner—M. Rachuba
(74) Attorney, Agent, or Firm—Oliff & Berridge, PLC

(57) ABSTRACT

The present invention relates to a polishing apparatus for restoring an optical disk. The objects of the present invention are as follows: to obtain an equal pressure appropriately required for polishing; to correct the accuracy of parallelism between the rotation planes of an optical disk and a polishing sheet; to remove roundness formed on the outer edge of an optical disk and unevenness in polishing; and to prevent clogging of the surface of a polishing sheet by the active elimination of abrasive filings and an occurrence of scratches on the surface of an optical disk due to the clogging. For the purpose of achieving the above objects, in an apparatus for polishing an optical disk composed of a disk rotator A and a polishing mechanism B, the polishing mechanism B has an elastic mechanism D for elastically holding a polishing pad C, a polishing sheet of the polishing pad C has such an elasticity that the deformation amount $\Delta x$ is 0.005 mm to 0.3 mm when the polishing sheet contacts the surface of the optical disk with a pressure required for polishing, the elastic mechanism D is constructed to have elasticity in the direction perpendicular to the rotation plane of the optical disk and rigidity in the direction parallel to the rotation plane of the optical disk, and the ratio of the disk angular speed $\omega a$ of the disk rotator A to the polishing sheet angular speed $\omega b$ of the polishing mechanism B is regulated to satisfy the range of $0.2 < \omega a/\omega b < 1.5$.

16 Claims, 4 Drawing Sheets

PRIOR ART

APPARATUS FOR POLISHING OPTICAL DISK

TECHNICAL FIELD

The present invention relates to a polishing apparatus for restoring optical disks, such as CD, DVD, VD and LD.

BACKGROUND ART

Recently, optical disks have been selling in large quantities. When a flaw or flaws are made on its surface, it is sometimes impossible to read data from the disk. It is therefore desirable to repair the disk and restore it to a readable state. In view of resource saving, it is not desirable to dispose of such reusable optical disks in large quantities.

Reference is made to FIG. 5, which shows an example of a conventional disk polishing apparatus. The apparatus is composed of a disk rotator A2 for rotating an object 31 and a polishing mechanism B2 for polishing the surface of the object 31. In the polishing mechanism B2, a polishing pad C2 is attached to a rotating substrate 33 fixed to a rotation shaft 32 via such an attachment means as the hook-and loop fastener VELCRO™. In the polishing pad C2, a polishing sheet 36 is attached to the bottom of a spongy elastic body 35.

Reference is made to FIG. 6a, which shows the case of polishing the surface of an optical disk with the above-constructed polishing apparatus. When the elastic body 35 of the polishing pad C2 is too soft, deformation occurs in the polishing face. Thus, in the course of polishing, roundness E is formed on the outer edge of the optical disk 31.

When, on the other hand, the elastic body 35 of the polishing pad C2 is not pliable, the pressure contact between the polishing face and the surface of the optical disk is tightened in part. It is therefore difficult to eliminate abrasive filings (e.g. polycarbonate powder), which clog the surface of the polishing sheet. Thus, the polishing power decreases and the accumulated filings cause small shallow cuts (i.e. scratches) on the surface of the optical disk.

Further, when the rotation plane of the optical disk is not kept parallel to that of the polishing sheet 36, it is impossible to adequately correct the planar accuracy of the polished face in the course of polishing, as shown in FIG. 6b.

Accordingly, the problems to be solved by the present invention are as follows: (1) to obtain an appropriate pressure required for polishing; (2) to correct the accuracy of parallelism between the rotation planes of an optical disk and a polishing sheet; (3) to remove roundness formed on the outer edge of an optical disk and unevenness in polishing; and (4) to prevent clogging of the surface of a polishing sheet by the active elimination of abrasive filings and an occurrence of scratches on the surface of an optical disk due to the clogging.

DISCLOSURE OF THE INVENTION

The first objective of the present invention is to provide an apparatus for polishing an optical disk composed of a disk rotator A for rotating an optical disk and a polishing mechanism B for polishing the surface of the optical disk, wherein the polishing mechanism B has an elastic mechanism D for elastically holding a polishing pad C and a polishing sheet of the polishing pad C has such an elasticity that the deformation amount Δx is 0.005 mm to 0.3 mm when the polishing sheet contacts the surface of the optical disk with a pressure required for polishing.

In this invention, it is possible to prevent clogging of the surface of the polishing sheet by the active elimination of abrasive filings and an occurrence of scratches on the surface of the optical disk due to the clogging. It is also possible to remove roundness formed on the outer edge of the optical disk and unevenness in polishing by regulating elasticity of the polishing sheet.

The second objective of the present invention is to provide an apparatus for polishing an optical disk composed of a disk rotator A for rotating an optical disk and a polishing mechanism B for polishing the surface of the optical disk, wherein the polishing mechanism B has an elastic mechanism D for elastically holding a polishing pad C and the elastic mechanism D is constructed to have elasticity in the direction perpendicular to the rotation plane of the optical disk and rigidity in the direction parallel to the rotation plane of the optical disk.

In this invention, it is possible to correct the accuracy of parallelism between the rotation planes of the optical disk and the polishing sheet. Thereby, the pressure contact between the polishing face and the surface of the optical disk can be appropriately equalized. Thus, it is possible to remove roundness formed on the outer edge of the optical disk and unevenness in polishing.

The third objective of the present invention is to provide an apparatus for polishing an optical disk composed of a disk rotator A for rotating an optical disk and a polishing mechanism B for polishing the surface of the optical disk, wherein the ratio of the disk angular speed $\omega a$ of the disk rotator A to the polishing sheet angular speed $\omega b$ of the polishing mechanism B satisfies the range of $0.2<\omega a/\omega b<1.5$.

In this invention, it is possible to increase the polishing efficiency and thus obtain an adequate amount of polishing by setting the ratio of the disk angular speed of the disk rotator A and the polishing sheet angular speed of the polishing mechanism B within a predetermined range. It is also possible to prevent an occurrence of clogging by facilitating the elimination of filings. Further, endurance of the polishing sheet can be improved.

BRIEF DESCRIPTION OF THE DRAWINGS

FIG. 4b is a plan view of the elastic mechanism shown in FIG. 4a.

BEST MODE FOR CARRYING OUT THE INVENTION

An embodiment of the present invention is described according to the drawings. A wet polishing apparatus is used in the present embodiment. In the wet polishing apparatus, when the surface 2a of a polishing sheet of a polishing pad C is pressed into contact with the surface 1a of an optical disk for the purpose of polishing, such liquid as water is supplied to the interface between the surfaces 1a and 2a. Thereby, frictional heat is eased and the elimination of filings is attained in the course of polishing.

Figure 1:
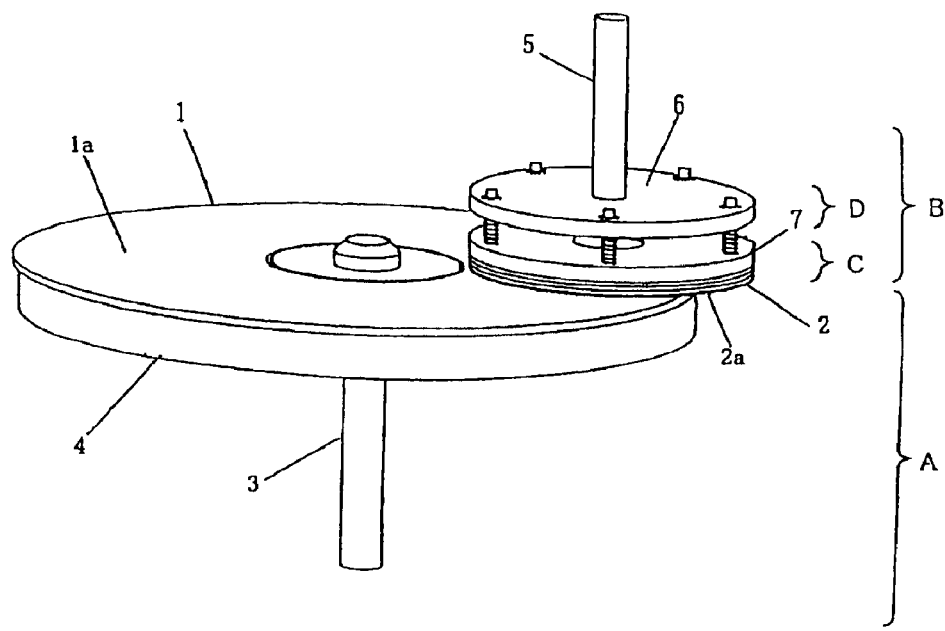
FIG. 1 is a perspective view showing the configuration of the disk rotator and the polishing mechanism.
Figure 2:
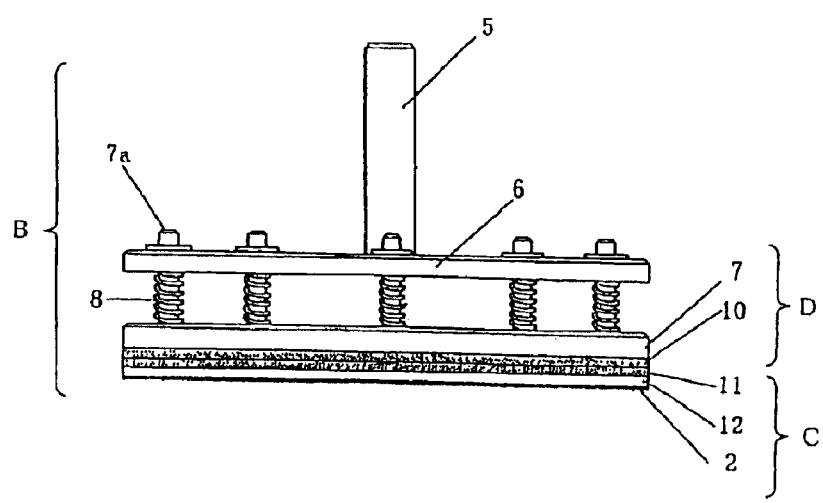
FIG. 2 is a side view of the polishing mechanism with a polishing pad attached.

Reference is made to FIGS. 1 and 2, which show an apparatus for polishing an optical disk according to the present embodiment. The apparatus is composed of a disk rotator A for rotating an optical disk 1 and a polishing mechanism B for polishing the surface of the optical disk. The polishing mechanism B has an elastic mechanism D for elastically holding a polishing pad C.

In the disk rotator A, the optical disk 1 is mounted on a rotating substrate 4 coupled with a rotation shaft 3.

Figure 3:
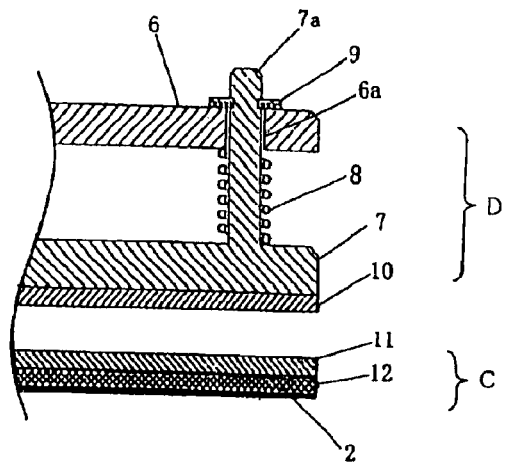
FIG. 3 is a partial sectional view of the polishing mechanism with a polishing pad unattached.

In the polishing mechanism B, the elastic mechanism D is constructed so that a second rigid body 7 is connected to a first rigid body 6 in a floating state, as shown in FIGS. 2 and 3. The polishing pad C is attached to the second rigid body 7. In the second rigid body 7, plural shafts 7a project upward from its circumferential vicinity. The first rigid body 6 is coupled with a rotation shaft 5. In the first rigid body 6, plural shaft holes 6a are provided in its circumferential vicinity. The shaft 7a is fitted into the shaft hole 6a through a coil spring 8 between rigid bodies 6 and 7. The shaft 7a is capable of sliding and is fixed by a fixing member 9.

The elastic mechanism D is therefore constructed to have elasticity in the direction perpendicular to the rotation plane of the optical disk 1 and rigidity in the direction parallel to the rotation plane of the optical disk 1. A magnetic body 10 is provided on the bottom of the second rigid body 7. The magnetic body 10 is magnetically joined with a metal substrate 11 of the polishing pad C as described later.

In the polishing pad C, as shown in FIG. 3, a polishing sheet 2 is attached via an elastic sheet 12 to the metal substrate 11 joined with the magnetic body 10.

The polishing pad C can be attached to the second rigid body 7 by a hook-and-loop fastener, such as VELCRO™, in addition to the magnetic attachment/detachment means. Instead of the polishing pad C being attached to and detached from the second rigid body 7, the integrated elastic mechanism D and polishing pad C may be attached to and detached from the rotation shaft 5.

Figure 4A:
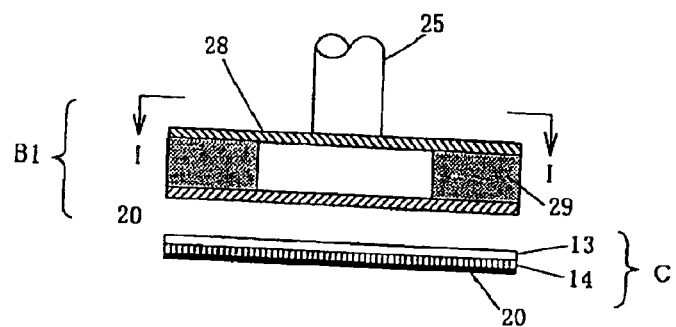
FIG. 4a is a partial sectional view of another type of elastic mechanism.
Figure 4B:
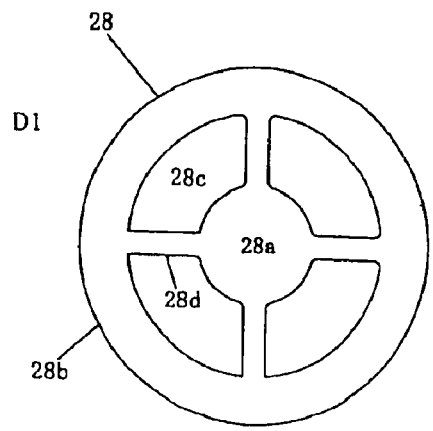
Figure 5:
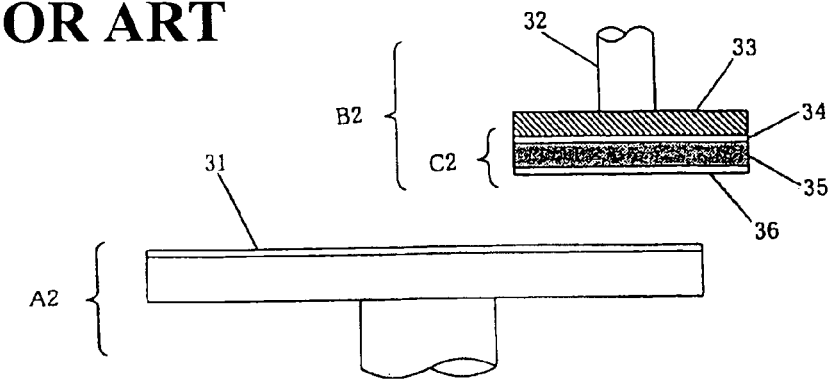
FIG. 5 is a side view showing the configuration of the conventional disk rotator and polishing mechanism.
Figure 6A:
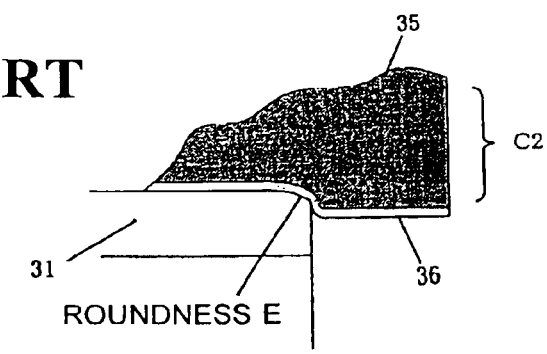
FIG. 6a is a partial sectional view explaining the function of the conventional polishing mechanism.
Figure 6B:
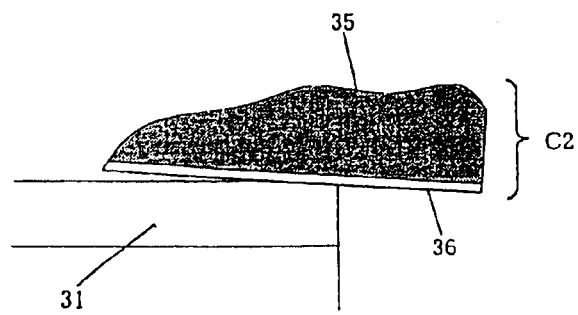
FIG. 6b is a partial sectional view explaining the function of the conventional polishing mechanism.

Reference is made to FIGS. 4a and 4b, which show another type of the elastic mechanism D. In this type elastic mechanism D, a magnetic body 20 is attached via a ring 29 to a ribbed elastic body 28 fixed to a rotation shaft 25 of a polishing mechanism B1. As shown in FIG. 4b (which is a plan view of the elastic mechanism shown in FIG. 4a), the ribbed elastic body 28 is formed so that an inner part 28a is connected to an outer part 28b by ribs 28d while creating a space 28c. The elastic mechanism D1 is thus constructed. Therefore, the elastic mechanism D1 is also constructed to have elasticity in the direction perpendicular to the rotation plane of the optical disk and rigidity in the direction parallel to the rotation plane of the optical disk.

EXPERIMENT EXAMPLE 1

The polishing pads were prepared by using the elastic sheets that differed in material and thickness. Next, these polishing pads were attached to the polishing mechanism B of the polishing apparatus according to the present embodiment. The surface of the polishing sheet of each polishing pad was pressed into contact with the surface of the optical disk with a pressure required for polishing. Samples 1–6 were thus obtained. Reference is made to Table 1, which shows the deformation amount $\Delta x$ of the surface of the polishing sheet in this case. Table 1 also shows the comprehensive as well as the individual rating regarding clogging of the surface of the polishing sheet and roundness formed on the outer edge of the optical disk. In the present experiment, the rotation speed of the disk rotator A is 500 rpm and that of the polishing mechanism B is 1200 rpm. The disk rotator A and the polishing mechanism B rotate in the same direction.

In the sample 1, the polishing sheet is directly attached to the metal substrate 11 of the polishing pad. That is, the elastic sheet is not in use. In the samples 2–6, various kinds of synthetic rubber are used as the elastic sheet. Also, the elastic sheets differ in thickness.

TABLE 1

| Sample No. | Material of Polishing Sheet | Deformation Amount $\Delta x$ (mm) | Rating of Clogging | Rating of Roundness | Comprehensive Rating |
|---|---|---|---|---|---|
| 1 | — | 0.000 | X | ○ | X |
| 2 | Synthetic Rubber | 0.005 | Δ | ○ | Δ |
| 3 | Synthetic Rubber | 0.01 | ○ | ○ | ○ |
| 4 | Synthetic Rubber | 0.1 | ○ | ○ | ○ |
| 5 | Synthetic Rubber | 0.3 | ○ | Δ | Δ |
| 6 | Synthetic Rubber | 0.5 | ○ | X | X |

Based on this result, the following facts were found: when the deformation amount (depression amount) $\Delta x$ is small, the surface of the polishing sheet is likely to be clogged; when it is large, roundness is likely to be formed on the outer edge of the optical disk; and it is preferable to set the deformation amount (depression amount) $\Delta x$ within the range of 0.005 mm to 0.3 mm, more preferably within the range of 0.01 mm to 0.1 mm.

EXPERIMENT EXAMPLE 2

With the polishing apparatus according to the present embodiment, the disk angular speed $\omega a$ of the disk rotator A and the polishing sheet angular speed $\omega b$ of the polishing were regulated to set the angular speed ratio at the values shown in Table 2. Samples 1–7 were thus obtained. As for these samples, an amount of polishing was measured. In the meantime, the elimination of filings, an occurrence of clogging, etc. were rated. These measurement and ratings are comprehensively shown in the column of "Rating of Amount of Polishing" of Table 2.

TABLE 2

| Sample No. | Disk Angular Speed/Polishing Sheet Angular Speed ($\omega a/\omega b$) | Rating of Amount of Polishing |
|---|---|---|
| 1 | 0.1 | X |
| 2 | 0.2 | Δ |

TABLE 2-continued

| Sample No. | Disk Angular Speed/ Polishing Sheet Angular Speed (ωa/ωb) | Rating of Amount of Polishing |
|---|---|---|
| 3 | 0.4 | ○ |
| 4 | 0.6 | ⊚ |
| 5 | 1.0 | ○ |
| 6 | 1.5 | Δ |
| 7 | 2.0 | X |

Figure 7A:
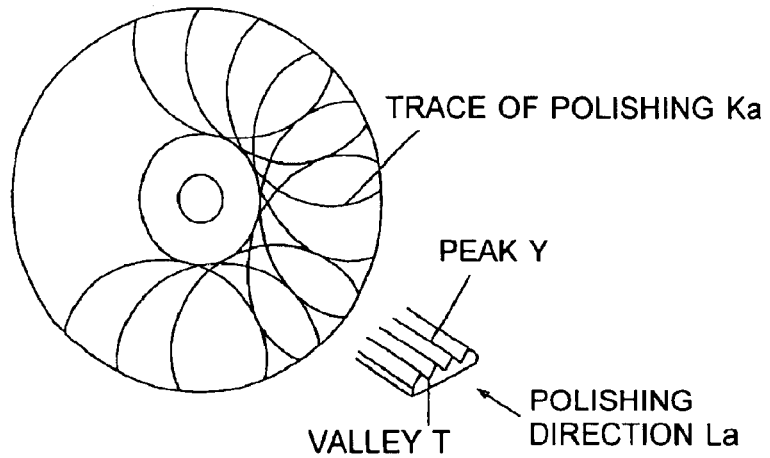
FIG. 7a is a plan view of a disk of a sample 1 in experiment example 2 and a perspective view of traces of polishing.

As for the sample No. 1 (ratio of 0.1) where the disk angular speed is low and the polishing sheet angular speed is high, the polishing sheet always effects polishing in the direction La parallel to a trace of polishing Ka, as shown in FIG. 7a. In this case, while the same abrasive grains of the polishing sheet always polish a peak part Y of the traces of polishing Ka, the other ones always polish a valley part T thereof. Therefore, the polishing efficiency is low and the amount of polishing decreases. Further, the polishing sheet is likely to be clogged because it is difficult to eliminate the filings. Thereby, endurance of the polishing sheet decreases.

Figure 7B:
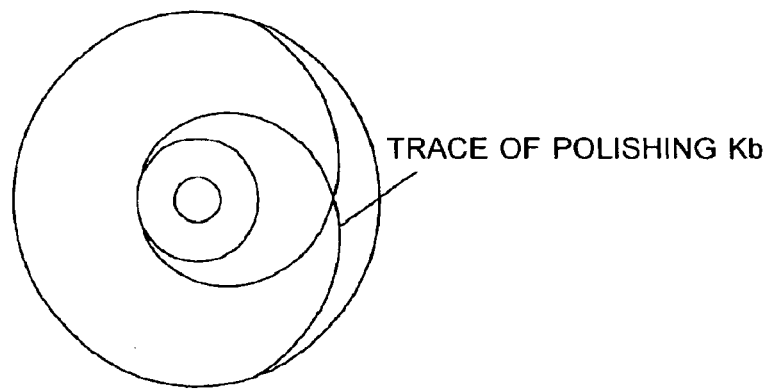
FIG. 7b is a plan view of a disk of a sample 7 in experiment example 2.

As for the sample No. 7 (ratio of 2.0) where the disk angular speed is high and the polishing sheet angular speed is low, long-distance polishing is effected while an abrasive grain on the surface of the polishing sheet rotates once, as shown in FIG. 7b. The abrasive grain is therefore likely to have polishing heat. Consequently, when the softened filings stick to the surface of the abrasive grain (i.e. polycarbonate powder), frictional resistance increases due to the clogging and thereby the polishing efficiency decreases.

Figure 7C:
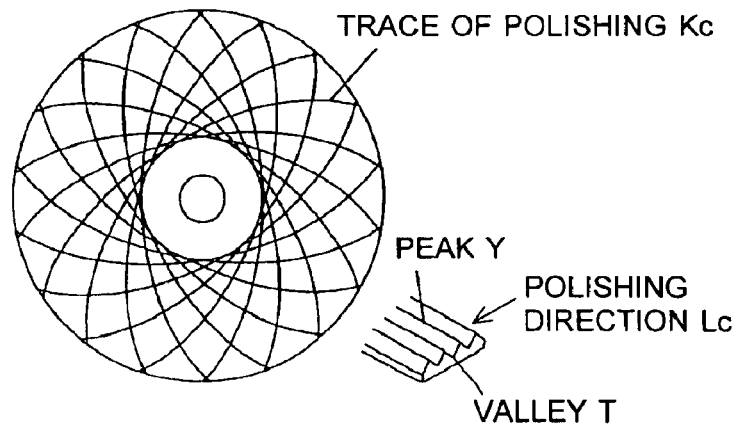
FIG. 7c is a plan view of a disk of a sample 4 in experiment example 2 and a perspective view of traces of polishing.

As for the sample No. 4 where the ratio of the disk angular speed and the polishing sheet angular speed is 0.6, the polishing sheet effects polishing in the direction Lc nearly perpendicular to a trace of polishing Kc, as shown in FIG. 7c. Therefore, differently from the case of the sample No. 1, the same part of the abrasive grains does not polish the peak part Y. That is, the peak part Y and valley part T are polished alternatively. In this case, the filings produced by polishing the peak part T are actively eliminated through the valley part T and thereby an occurrence of clogging is prevented.

Based on the above result, the following facts were found: while it is desired to set the ratio of the disk angular speed and the polishing sheet angular speed appropriately, it is preferable to set the angular speed ratio within the range of $0.2<\omega a/\omega b<1.5$, more preferably within the range of $0.4<\omega a/\omega b<1.0$.

As described above, in this invention, it is possible to prevent clogging of the surface of the polishing sheet by the active elimination of abrasive filings and an occurrence of scratches on the surface of the optical disk due to the clogging. It is also possible to correct the accuracy of parallelism between the rotation planes of the optical disk and the polishing sheet. Thereby, the pressure contact between the polishing face and the surface of the optical disk can be appropriately equalized. Thus, it is possible to remove roundness formed on the outer edge of the optical disk and unevenness in polishing. It is further possible to increase polishing efficiency and thus obtain an adequate amount of polishing by setting the ratio of the disk angular speed of the disk rotator A and the polishing sheet angular speed of the polishing mechanism B within a predetermined range. Furthermore, it is possible to prevent an occurrence of clogging by facilitating the elimination of filings and thereby endurance of the polishing sheet can be improved.

What is claimed is:

1. An apparatus for polishing an optical disk composed of a disk rotator A for rotating an optical disk and a polishing mechanism B for polishing the surface of the optical disk, wherein the polishing mechanism B has an elastic mechanism D for elastically holding a polishing pad C and a polishing sheet of the polishing pad C has such an elasticity that the deformation amount Δx is 0.005 mm to 0.3 mm when the polishing sheet contacts the surface of the optical disk with a pressure required for polishing.

2. An apparatus for polishing an optical disk composed of a disk rotator A for rotating an optical disk and a polishing mechanism B for polishing the surface of the optical disk, wherein the polishing mechanism B has an elastic mechanism D for elastically holding a polishing pad C and the elastic mechanism D is constructed to have elasticity in the direction perpendicular to the rotation plane of the optical disk and rigidity in the direction parallel to the rotation plane of the optical disk.

3. An apparatus for polishing an optical disk composed of a disk rotator A for rotating an optical disk and a polishing mechanism B for polishing the surface of the optical disk, wherein the ratio of the disk angular speed ωa of the disk rotator A to the polishing sheet angular speed ωb of the polishing mechanism B satisfies the range of $0.2<\omega a/\omega b<1.5$.

4. The apparatus for polishing an optical disk according to claim 1, wherein the elastic mechanism D includes:
   a) a first plate member;
   b) a second plate member sliding against a bar member provided on the first plate member; and
   c) an elastic member with the bar member fitted by insertion between the first and second plate members.

5. The apparatus for polishing an optical disk according claim 1, wherein the elastic mechanism D is a ribbed elastic body.

6. The apparatus for polishing an optical disk according to claim 1, wherein the polishing pad is attached to and detached from the elastic mechanism D by a magnetic attachment/detachment means or a Hook-and-Loop fastener.

7. The apparatus for polishing an optical disk according to claim 1, wherein the integrated elastic mechanism D and polishing pad C are attached to and detached from a rotation shaft.

8. The apparatus for polishing an optical disk according to claim 2, wherein the elastic mechanism D includes:
   a) a first plate member;
   b) a second plate member sliding against a bar member provided on the first plate member; and
   c) an elastic member with the bar member fitted by insertion between the first and second plate members.

9. The apparatus for polishing an optical disk according to claim 2, wherein the elastic mechanism D is a ribbed elastic body.

10. The apparatus for polishing an optical disk according to claim 2, wherein the polishing pad is attached to and detached from the elastic mechanism D by a magnetic attachment/detachment means or a Hook-and-Loop fastener.

11. The apparatus for polishing an optical dish according to claim 4, wherein the polishing pad is attached to and detached from the elastic mechanism D by a magnetic attachment/detachment means or a Hook-and-Loop fastener.

12. The apparatus for polishing an optical disk according to claim 5, wherein the polishing pad is attached to and detached from the elastic mechanism D by a magnetic attachment/detachment means or a Hook-and-Loop fastener.

13. The apparatus for polishing an optical disk according to claim 2, wherein the integrated elastic mechanism D and polishing pad C are attached to and detached from a rotation shaft.

14. The apparatus for polishing an optical disk according to claim 4, wherein the integrated elastic mechanism D and polishing pad C are attached to and detached from a rotation shaft.

15. The apparatus for polishing an optical disk according to claim 5, wherein the integrated elastic mechanism D and polishing pad C are attached to and detached from a rotation shaft.

16. The apparatus for polishing an optical disk according to claim 6, wherein the integrated elastic mechanism D and polishing pad C are attached to and detached from a rotation shaft.

* * * * *